May 21, 1968  R. M. HALL  3,384,085
SURGICAL CUTTING TOOL
Filed July 3, 1964  7 Sheets-Sheet 1

INVENTOR.
ROBERT M. HALL
BY
CAROTHERS AND CAROTHERS
HIS ATTORNEYS

May 21, 1968 R. M. HALL 3,384,085

SURGICAL CUTTING TOOL

Filed July 3, 1964 7 Sheets-Sheet 2

INVENTOR.
ROBERT M. HALL
BY
CAROTHERS AND CAROTHERS
HIS ATTORNEYS

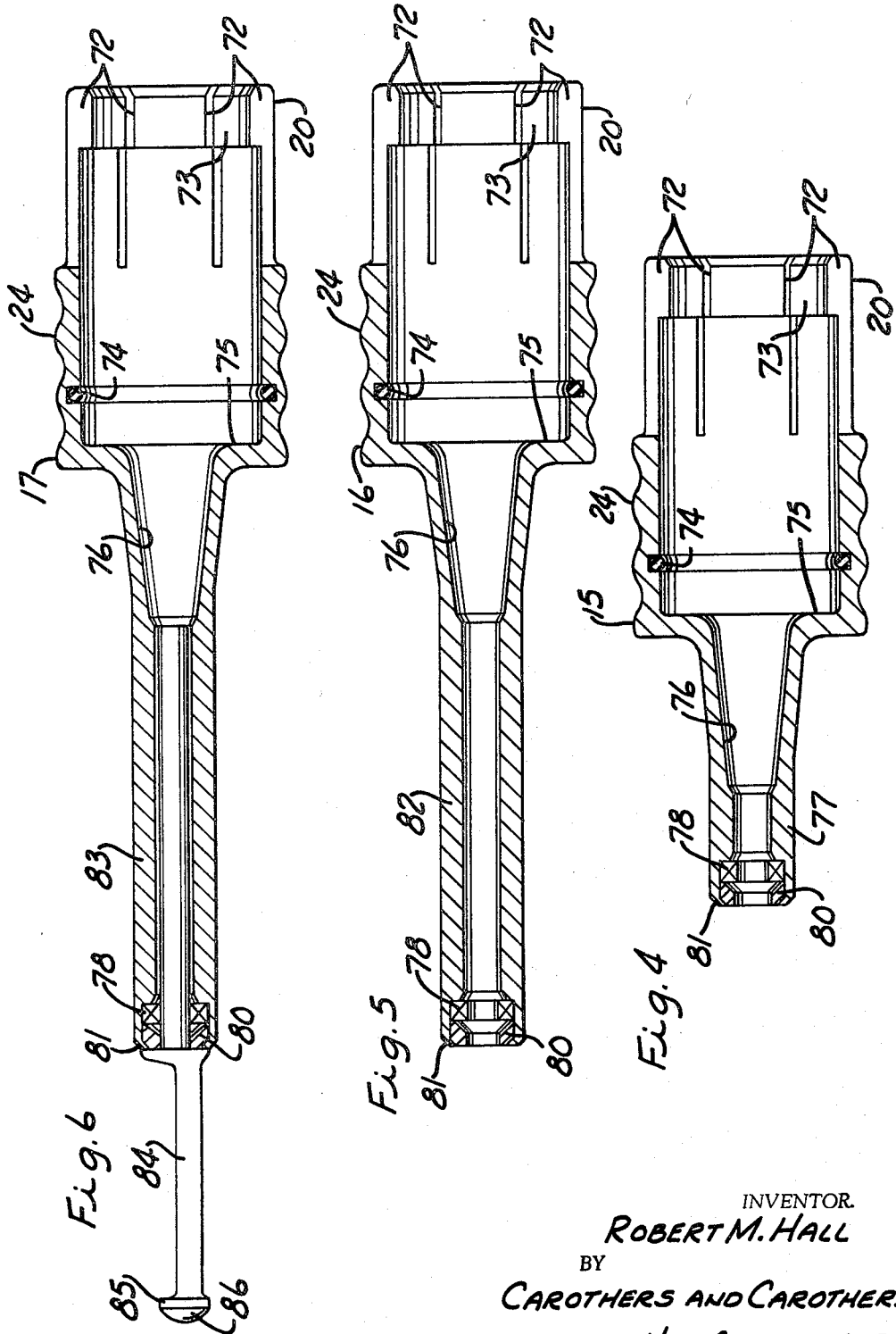

INVENTOR.
ROBERT M. HALL
BY
CAROTHERS AND CAROTHERS
HIS ATTORNEYS

May 21, 1968 R. M. HALL 3,384,085
SURGICAL CUTTING TOOL
Filed July 3, 1964 7 Sheets-Sheet 6
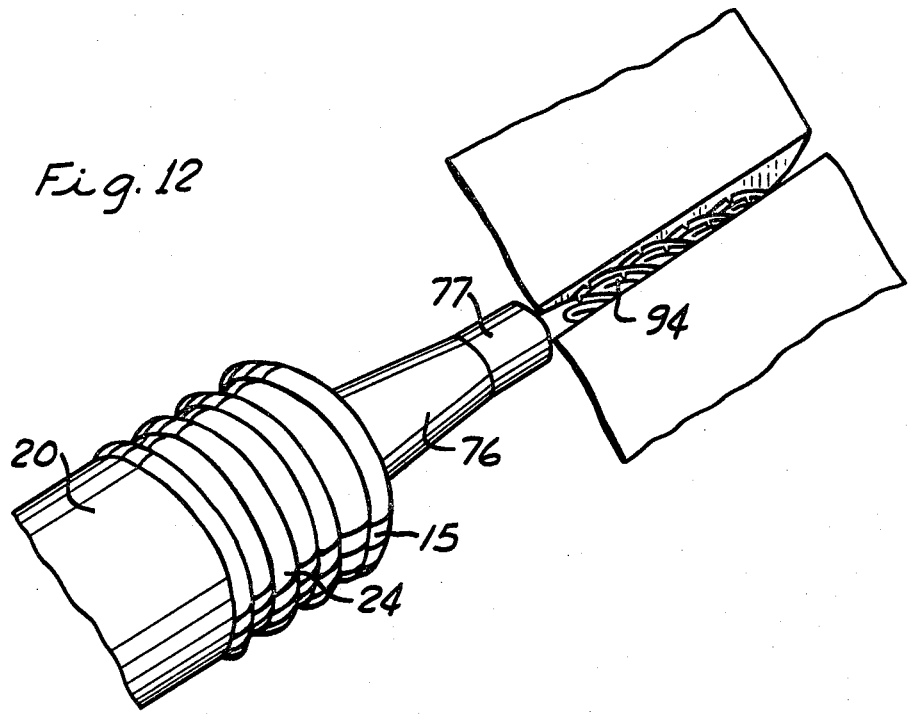
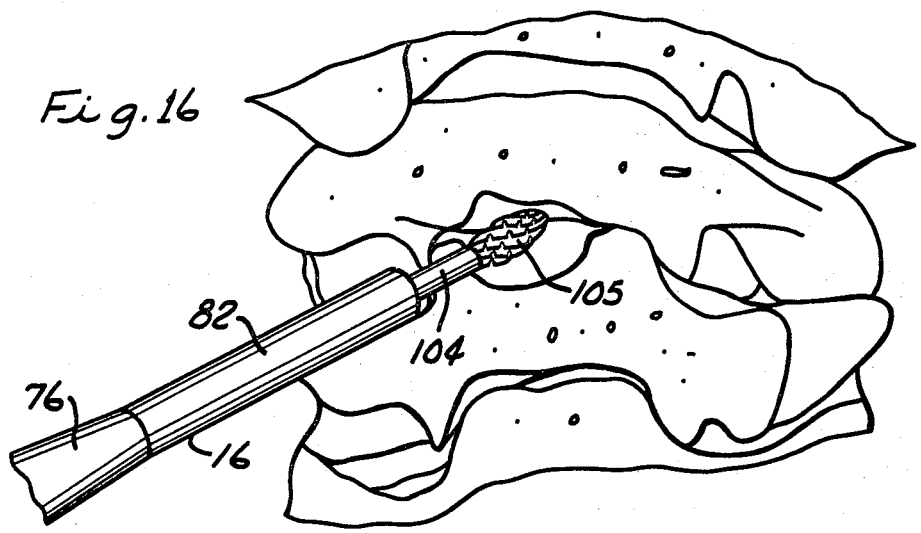
INVENTOR.
ROBERT M. HALL
BY
CAROTHERS AND CAROTHERS
HIS ATTORNEYS

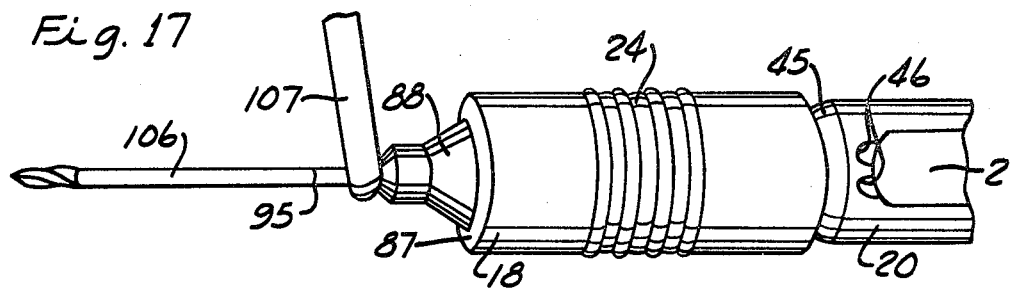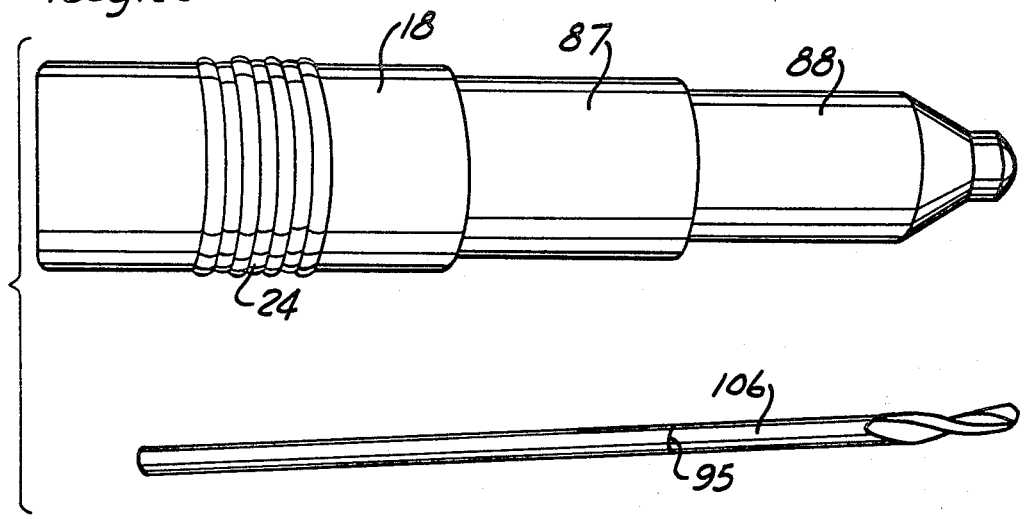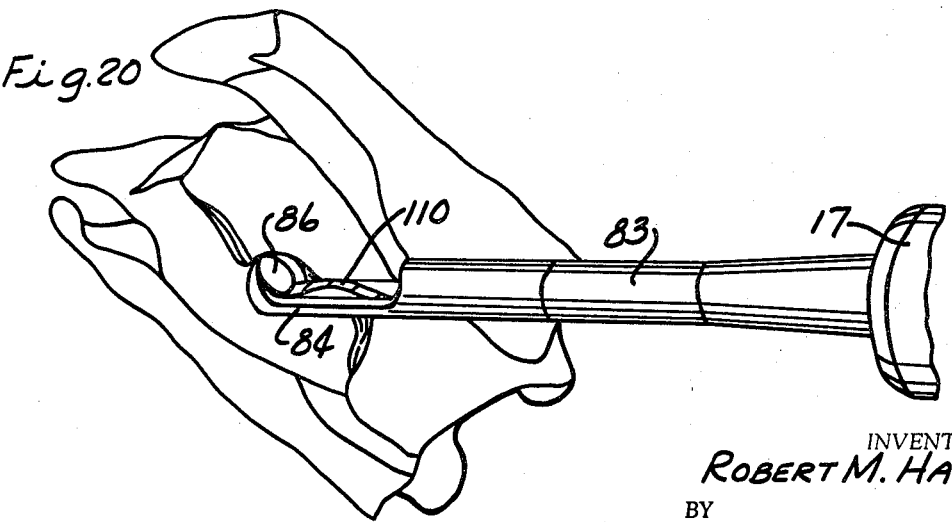

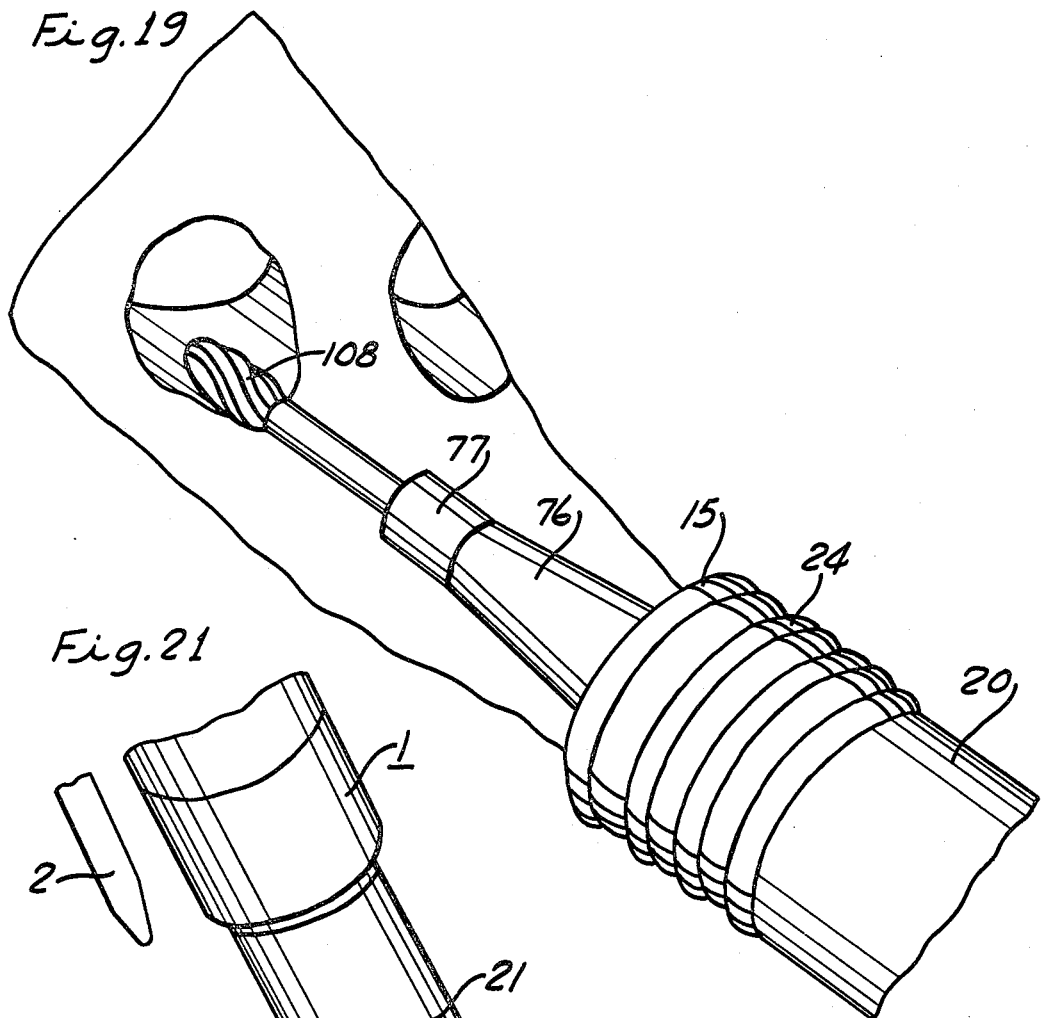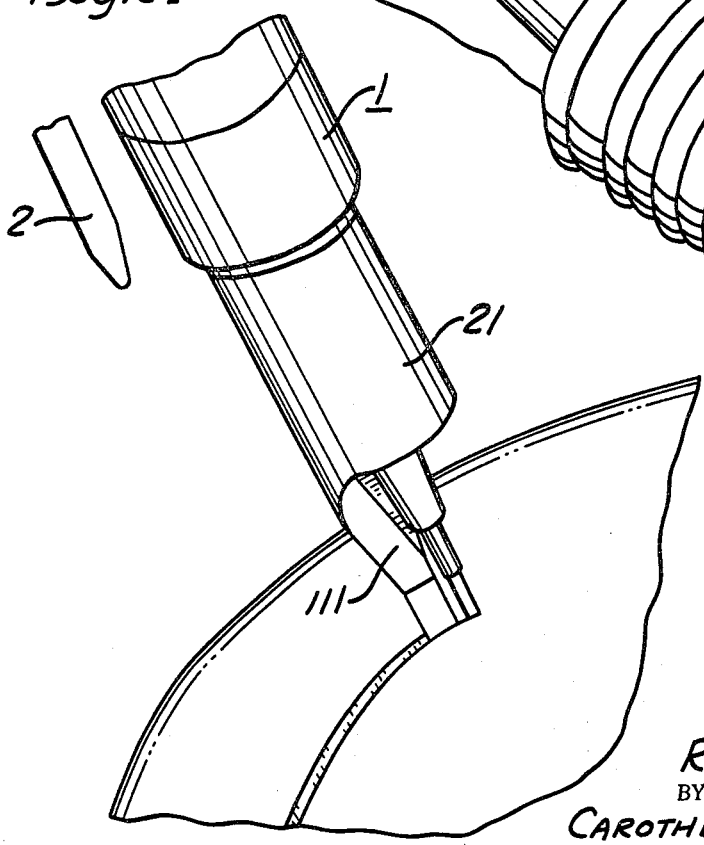

United States Patent Office 3,384,085
Patented May 21, 1968

3,384,085
SURGICAL CUTTING TOOL
Robert M. Hall, Priscilla Lane, Rosslyn Farms,
Carnegie, Pa. 15106
Filed July 3, 1964, Ser. No. 380,171
7 Claims. (Cl. 128—305)

This invention relates generally to power driven surgical cutting tools and more particularly to a high speed surgical cutting instrument for use in surgery of orthopedic, neuro, otology, rhinology, laryngology, ophthalmology, oral, and is outstanding in many other fields.

The high speed air drill introduced in dentistry and dental surgery provided a new technique in the dental field. The use of high speed burrs for cutting the decay from teeth in combination with water and air coolants was a material advancement as a time saver and for accuracy. Such dental tools are inadequate for surgery not only because of their power drill mechanism but principally because of the tools themselves and their limitations.

Although the use and showing of the power actuated surgical cutting instrument of this invention employs a rotary cutting power tool, this invention encompasses the use of a high speed reciprocatory power tool and the cutting tool itself will be supported in the same manner. Thus the combination of the rotary and reciprocatory motions are also feasible independently and jointly in this invention.

The principal object of this invention is the provision of a surgical cutting instrument to remove tissue that is soft as well as a resistant hard tissue such as calcium deposits or in the aortic valve sculpturing, cartilege, and bone which provides the simplest material because it may be very accurately cut.

There are many other objects of this invention which support this principal object which are directed to different phases of this invention such as the specific cutting tools and the manner of supporting them in the hand housing.

One object lies in the variety of different cutting tools all of which will fit the same drive chuck of the power means or motor means but require different types of outboard support means. In some instances the work is so exposed and near to the skin of the patient that outboard support does not seem necessary but the outboard support in such cases shortens the tool length without visual obstruction. The bearing in the hand housing is spaced inwardly of the cutting tool chuck or collet on the spindle. Thus the bit on the end of a long cutting tool needed for surgery places the support so far away from the bearing that the flexibility in the tool shank is sufficient to cause it to whip at one hundred thousand r.p.m. The same would result in a reciprocating cutting action. This prevents the use of pressure to do the work. It also destroys the precision.

A very important object of this invention resides in preventing any vibratory motion to the high speed tool to give the operator a precision tool that does not require a heavy hand control and will not exhaust or tire the user. This permits the use of new bone drill and jaw techniques that not only provide precision bone cutting and shaping during surgery but permits a new field in surgical procedure.

Another object is the provision of a spark-free energy source of surgical procedure wherein the entire unit is autoclavible making it available in the surgical area. This rapid and precision bone cutting and shaping shortens the surgical time to eliminate surgeon fatigue and patient trauma associated with conventional hand instrumentation that include the time consuming hammers and chisels and heavy electrically powered saws and drills which advantages are all important advancements due to this invention.

Another object is the provision of a novel surgical instrument for use in many branches of specialized surgery such as bone osteotomies, anterior and posterior spinal fusions, laminectomies, preparation of autogenous and homogenous bone grafts, bone biopsies, hand surgery bone plating, arthodesis and other similar surgical procedures in the field of orthopedic surgery.

In the field of neurosurgery this novel surgical cutting instrument provides a new technique for anterior and posterior spinal fusions, laminectomies, decompressions, removal of osteophytes, foraminotomies, crainioplasties shaping and contouring bone and acrylic, preparation of vertebrae, cutting and shaping bone graft, anterior cervical fusion, anterior lumbar fusion, excision of bone tumors and trephining the skull.

In oral surgery this new and improved cutting instrument is good for removing bone about impacted teeth sectioning impacted teeth, apicoectomies, removal of al torii mandibulii, alveolectomies, vertical mandibular osteotomy, interosseous wire holes, shaping and contour of bone and acrylic for use in oral surgery.

This cutting instrument provides a fast and skilled method not heretofore found available in the surgical ar of otorhinolaryngology including specifically surgery for otology, rhinology, laryngology and ophthalmology. Plastic and reconstructive surgery may be improved technologically with this precision cutting instrument particularly in preparation of bone grafts, marginal and mandibular resection, lateral nasal osteotomies, hand surgery, dermabrasions and for making fine wire holes in bone. Obviously many other specific types of surgery may be more skillfully done with this cutting instrument and the manner of its construction aids not only in the accuracy but in the ease in performing the operation and without excessive surgeon fatigue or patient trauma as previously stated.

The air driven drill saw is made applicable to almos any bone surgery procedure. It weighs only six and one-half ounces and is capable of speeds more than one hundred thousand r.p.m. The drill will not accidently cut soft tissue which makes it an outstandingly useful tool for work near the spinal cord. The drill saw is operated by a simple reflexive pressure finger that con trols the air valve and a very light touch enables it to operate at high speeds and cut with minimum of fric tion of heat which permits one to retain normal bon histology. The air drill is perfectly balanced in a two stage air turbine. It can be operated on a standard com pressed air or nitrogen tank regulated to deliver on hundred p.s.i. through the pressure regulator.

The many different sizes and shapes of cutting tool are vastly different than those of the similar tools used in dentistry. These tools together with the outboard too support detachably carried on the air drill provide vis ibility to the exposed end of the cutting tool when pro jected considerably in front of the drill. Each of the burrs, rasps and saw blade drills and other tools ar instantly interchangeable with the aid of forceps whicl permit the tools to be handled and inserted and remove and the entire unit including the air drill and its supply line and all the aforementioned attachments may b readily autoclaved for use in the operating area. Thi whole unit may be housed in the container that permit the drill saw and all its attachments to be autoclaved a the same time and subjected to severe changes in tem perature if it is desired to quickly cool the same after re moving it from 275° steam temperature.

Other objects and advantages appear hereinafter in th following description and claims.

The accompanying drawings show for the purpose o exemplification without limiting this invention or the claims thereto, certain practical embodiments illustrating the principles of this invention wherein:

FIG. 3 is a view in section of the air saw twice its normal size and illustrating each of its component parts.

FIG. 4 is a sectional view of the short outboard tool support shown in FIG. 2.

FIG. 5 is a sectional view of the long outboard tool support shown in FIG. 2.

FIG. 6 is a sectional view of the laminectomy tool support.

FIG. 7 is a sectional view of the telescopic collapsible outboard tool support comprising this invention.

FIG. 12 is a view of a drill having a tapered cutting section with the flutes extending to a larger diameter at the base of the taper.

FIG. 16 is a view of a fluted bone removal burr.

FIG. 17 is a view illustrating the insertion of a drill and a collapsible outboard tool support.

FIG. 18 illustrates the same tool and the same outboard support free from the housing.

FIG. 19 is a view showing a cutting tool with an outboard tool support for forming an antrum window.

FIG. 20 is a view showing the application of a laminectomy outboard tool support.

FIG. 21 shows a view employing a craniotomy outboard tool support which functions as a guard in separating and protecting the dura while cutting the skull.

Figure 1:
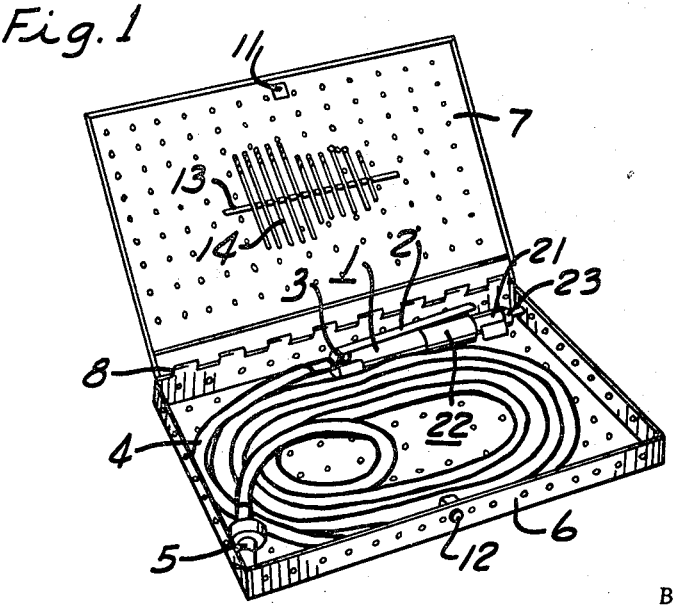
FIG. 1 is a perspective view showing the bits, the drill saw together with the supply line and its connections neatly coiled in a box in which each of the tools may be autoclaved.

Referring to FIG. 1 and FIG. 3 of the drawings the surgical cutting instrument is illustrated at 1 and is provided with the throttle lever 2 hinged at 3 with the fluid line 4 extending therefrom to the coupling member 5 where it may be attached by a quick coupling connection to a regulating valve on a cylinder containing a gas such as air or nitrogen or oxygen if the two former are not available. The flexible line or hose 4 is coiled neatly in the box 6 having a lid 7 hinged at 8. This box is perforated on the bottom and in the lid to permit the ingress and egress of steam when autoclaving the parts carried therein.

This box is preferably made of perforated stainless steel and the lid is provided with an abutment 11 to be received by the cage 12 for locking the depression clasp for temporary holding the lid closed. The lid is provided with a stainless steel coil spring 13 which has a series of saw drill and other types of cutting tools 14. These tools are merely held between the helical turns of the spring and thus retain them until they are needed in the operating area. Here the whole box and all the tools herein are ready for use in the operating area after being removed from an autoclave.

Figure 2:
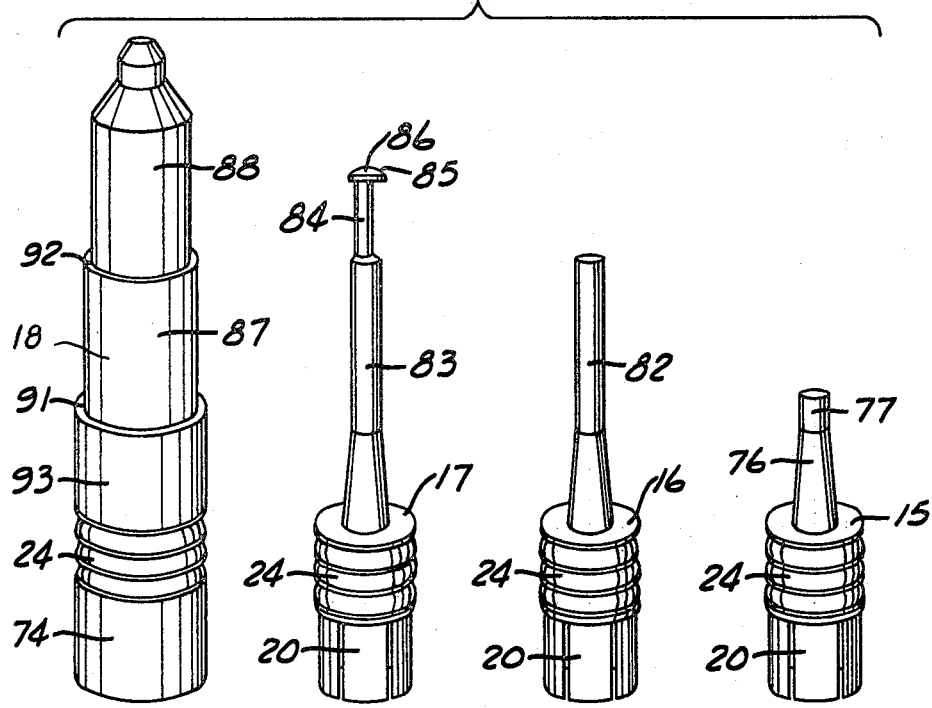
FIG. 2 shows a group of outboard tool supporting means which may be placed in the box shown in FIG. 1 for autoclaving at the same time.

The group of outboard tool supports shown in FIG. 2 illustrates the respective outboard tool supports shown in section in FIGS. 4, 5, 6 and 7 and designated as the short outboard tool support 15, the long outboard tool support 16, the laminectomy outboard tool support 17 and the telescopic collapsible outboard tool support 18. Each of the outboard tool supports 15, 16 and 17 are provided with a collet type grip 20 which engages the mounting surface 21 of the hand piece 22 which may be made in several sections as illustrated in FIG. 3. If the collet type grip 20 is too snug it may be gently loosened by slipping the fingers of the collet over the rounded locking sleeve 23 at the end of the mounting surface 21 and slightly prying the same until it is sufficiently loose. If this collet becomes too loose the collet fingers may be forced against a hard surface to gently close the same and such a manual adjustment may be quickly performed when changing cutting tools if by chance the collet fingers were loosened when removing the same to change the outboard tool support.

The next section of each of the outboard tool supports 15 to 17 is provided with an annular series of depressions forming ribs 24 which provide a gripping surface for glove fingers when inserting or turning to withdraw the outboard tool support from the mounting surface 21 on the end of the surgical cutting instrument 1. The outboard support 18 has a socket 79 to receive the mounting surface 21 and secure the same in place.

Referring to FIG. 3 the instrument 1 is made up of the hand piece 22 having a rear portion 25 which is a solid block provided with the threaded opening 26 for receiving the threaded fitting on the end of the hose or supply 4. The air entering this end of the block passes through the port 27 to the valve chamber 28 having a valve cage 30 with lateral ports 31 connected with the bore 32 and which is made to slide the valve member 33 that rests on the valve seat 34 supported on the end of the valve cage 30. The valve stem 33 rides in the bore 32, the valve head 35 seats on the O-ring valve seat 34 and is held in position by the spring 36. Thus, when the handle 2 is depressed and engages the end of the stem 33, the valve head 35 is raised from the seat 34 and admits air through the passage 37 to the chamber 38 at the front end of the rear portion 25. From the chamber 38 the air is discharged through the nozzle ports 40 to the rotary turbine blades 41 which are preferably arcuate and thence the air is discharged through the stationary blades 42 that are arcuate in the opposite direction and from whence the air is discharged through the second stage of the rotary turbine 43 and thence through the outlet 44 to the air shield sleeve 45 which acts an an air guide shield and thence through its outlet 46 against the baffle 47 on the underside of the throttle level 2 which directs the main discharge of the air rearwardly under the control lever 2 to where it is again directed by the inturned section 48 adjacent the pivot pin 3 to discharge the air at the hose connection. A small portion of the air will flow forwardly through the outboard bearing 50 and thence outwardly in the bore of the rounded locking sleeve 23. The turbine rotors 41 and 43 are secured to the shaft 51 and which are held in place by the nut 52 with the inner race of the motor bearing 53 lying between the two air turbines and the outer race mounted on the sleeve of the stator 42. The shaft 51 has the sleeve 54 placed thereon which forms a stop abutment for the air turbine rotor 43 when it in turn is stopped by the inner race of the outer bearing 50 which is assembled against the shoulder 55. The outer end of the shaft is provided with a collet or tool chuck 56 which carries a sleeve type bearing 57 that could engage and be held by the bearing locking sleeve 23 for the outer race of the bearing 50.

Thus the shaft 51 functions to support the air turbines as well as provide the collet socket or chuck for the cutting tools and the opposite end of this shaft has a brake area 58 for engaging the stationary brake member 60 which is sealed by the O-ring in the part 25 and is slidably axially by reason of the pressure of the spring 61 which urges the brake member 60 forwardly to engage the shaft and thus stop the same. When the throttle lever 2 is depressed, it first engages the brake actuator 62 which is biased by the spring 63 to move radially outwardly. The inner end of the spring 63 is mounted on a shoulder. The brake actuator 62 has a tapered section 64 that enters the lateral opening 65 in the brake member 60 and the smaller portion extends therethrough as indicated at 66 where it is slidable within the passage 67 in the block 25. Thus by depressing the throttle lever, the brake actuator tapered section 64 engages the side of the hole 65 and retracts the brake from engagement on the face 58 of the shaft 51 and thereby permits the same to run freely in its bearings 50 and 53. The spring 64 is the principal pressure on the throttle lever 2. The housing extension 70 has a threaded socket for securing the block 25 and is provided with a locking ring 71. This housing extension 70 receives the sleeve 45 in a sliding press fit and supports the stator 52 and the bearing 53 as well as the bearing 50. Thus the bearing points are maintained in the single forward section 70 forming a part of the hand piece 22 that is secured to the rear block 25 which forms the other part of the hand housing making up the motor 1.

As shown in FIG. 4 the outboard tool support 15 with its hand grip 24 and collet 20 having six longitudinally disposed radial slots 72 provide an inner gripping surface 73 that cooperates with the O-ring 74 for securing the same on the mounting surface 21 of the motor 1. The end of the rounded locking sleeve 23 engages the inner shoulder 75 on the outboard tool support and the end of the collet 20 is just about in engagement with the end of the sleeve 45. There is sufficient clearance in the frusto conical section 76 to receive the end of the shaft forming the tool chuck 56 in spaced relation so that there can be no engagement between the frusto conical section of the end of the shaft 51 and the inner surface of the outboard support.

At the end of this frusto conical section 76 the outboard support has a cylindrical section 77 which terminates in an enlarged seat for receiving the antifrictional bearing 78 which is locked in place by the frusto conical spacer 80 that is secured by the spun-oven and faced-off end 81 of the outboard tool support.

The spacer 80 is arranged so that it will engage only the outer race of the bearing 78 and keep it in aligned position against the shoulder of the seat. Thus on opposite sides the bearing has a frusto conical space to receive the slight discharge of air that passes through the bearing 50 and is discharged around the outer end of the shaft 51 and is held within the outboard tool support being sealed by the clamping O-ring 74 thereby requiring this small amount of air to be further discharged through the bearing 78 and thence along the shaft or stem of the cutting tool. This air is, of course, considerably less than that discharged back under the control handle but is important in maintaining the bearings 50 and 78 clean and cool. The air is sufficient to keep any liquid or tissue from entering in and around the stem of the cutting tool to the bearing when this surgical tool is in use.

The inner diameter of the inner race of the bearing 78 may be as much as .0937 of an inch. Whereas the inside diameter of the spacer 80 is .0977 or .004 of an inch greater. This .004 of an inch clearance is sufficient to prevent engagement and it is also sufficient to prevent large undesirable viscose liquids or material from entering between the stem of the tool and the spacer even when the machine is not in operation.

This outboard tool support together with the others is thus provided with a resilient gripping collet that engages the mounting surface 21 of the outer tubular section 70 of the hand piece 22 by the pad 73 of the collet fingers and it also provides a resilient embracing by the O-ring 74 on the mounting surface 21 in spaced relation from the collet pad 73 which maintains good alignment and strong support of the outboard bearing 78 but at the same time will permit a tolerance of independent vibration if the stem of the cutting tool has been injured or become slightly bent, yet the bearing still functions to perform its job.

The other outboard tool supports shown in FIGS. 5 and 6 have a similar construction to that of FIG. 4. However, the outer section 77 has been increased in length in the outboard tool support 16 as illustrated in FIG. 5 at 82 and in FIG. 6 at 83, thus placing the bearing 78 materially further from the bearing 50. This outboard tool support is attached in the same manner as that previously described. Here the bearing must perform a greater function in preventing any whipping or lateral vibratory action of the cutting tool owing to the greater distance between the two bearings 78 and 50.

Referring to FIG. 6 laminectomy outboard tool support is provided with the same structural features as the other outboard tool supports but it has the bearing 78 positioned in a little different manner, but it is still substantially the same distance as that shown in FIG. 4. Here the section 83 not only carries the bearing but it carries the extension 84 which is open on one side to expose the cutting tool for the full extent of the same and the outer end of the extension 84 is provided with a cap 85 having a central opening 86 for the purpose of inserting the threaded tool through the bearing 78 and into the chuck 56 of the shaft 51. Thus in each of these structures a bearing is placed adjacent the cutting head of the cutting tool to provide an antifriction support for the cutting tool and support the same against lateral whipping and to transmit to the cutting tool sufficient pressure adjacent its cutting edge so that it is effective in very readily cutting through bone and other hard tissue during surgical operations.

In the structure shown in FIG. 7 the collapsible outboard tool support 18 has socket 79 for the purpose of engaging the cylindrical mounting surface 21 on the end of the section 70 of the hand piece 22 which provides this larger outboard tool support with a firm anchor. Here the cutting tool that is ordinarily employed would be a cutting drill where it is intended that the drill be covered and enclosed through a considerable portion of the flesh of the person on which the operation is being performed such as fixing a bone plate to a femur and for drilling the femur for the insertion of a nail. Here the drill is supported adjacent its cutting edge and the collapsible housing sections 87 and 88 which are spring biased by the spring member 90 to extend outwardly and engage the stop shoulders as indicated at 91 and 92 and as the drill cuts its way into and through the bone the section 88 collapses into the section 87 until it is completely collapsed and then the section 87 collapses into the main housing 93 of the outboard tool support 18. Here the limitation is dependent upon the clearance allowed between the collapsing or telescoping cylinders 87 and 88 within the cylinder 93. As the drill is withdrawn from the hole that it has made, the collapsible sections 87 and 88 will be extended to enclose the same and prevent anything from engaging the tool.

Figure 8:
FIG. 8 is a view of a cutting tool having a drill point with tapered spiral teeth.

Referring to FIG. 8 the cutter 94 has six flutes defining six teeth which are disposed on a ten degree right hand spiral on the end of which is formed a drill point The taper extends for the distance as shown. However the flutes extend therebeyond but short of the safe line 95. When this cutting tool is inserted through the outboard bearing into the shank of the tool, the line 95 should pass from view. A cutting tool of this character may be inserted by forceps and after it has been inserted the end of the cutting head may be pressed against a hard object for pressure in order to insure that it is fully inserted. The cutting tool forcep is preferably employed to insert and withdraw the cutting tools from the chuck and since the tolerances are rather close it is best to have the forces for inserting and withdrawing the same in alignment with the axis of the cutting tool. When the cutting tool is fully and properly inserted, the safe circle will no be visible. If the cutting tools are bent or otherwise injured, they should not be employed because they accentuate any tendency to whip at high speeds. The taper of this long cutting tool permits it to function as a saw in sectioning a part or a whole of a bone member.

Figure 9:
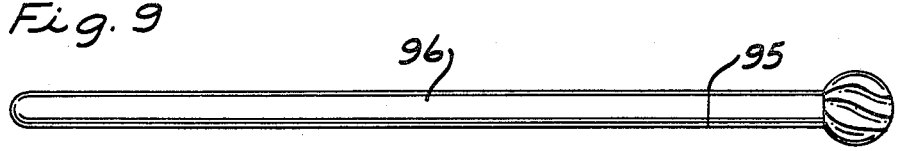
FIG. 9 is a view of a cutting tool with a large round burr.

FIG. 9 shows a round cutting tool known as a burr which may be provided with any desirable number of cutting teeth. However, these teeth like that of the drill should be spiral and be provided with a radial rake having two teeth to cut across the center. This cutting tool 96 is also provided with a safe line 95.

Figure 11:
FIG. 11 is an enlarged view showing the drill end of FIG. 10.
Figure 10:
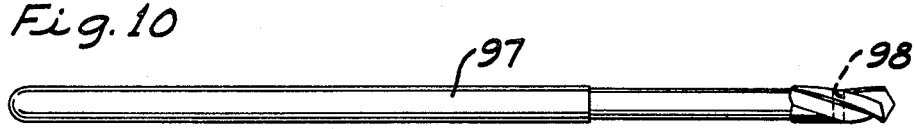
FIG. 10 is a view with a drill cutting tool having a transverse wire hole.

In FIGS. 10 and 11 the cutting tool 97 is in the form of a drill having two flutes and two teeth with a drill point on the end thereof. One distinguishing characteristic of this cutter is that it is provided with a transverse hole 98 which is more readily shown in FIG. 11. After the drill has been utilized to make an opening through bone structure the hole 98 is employed to withdraw the wire or other tying element that is to be employed in securing the bone structures together whether it be several bones such as in the hand or whether it be a jaw.

In FIG. 12 a cutting tool such as shown at 94 in FIG. 8 is illustrated as being employed in sawing through a bone section. Here the cutting tool 94 is mounted in the outboard tool support 15. This application shows how close the cutting member is to the bearing seat within the cylindrical portion 77 at the end of the outboard tool support 18.

Figure 13:
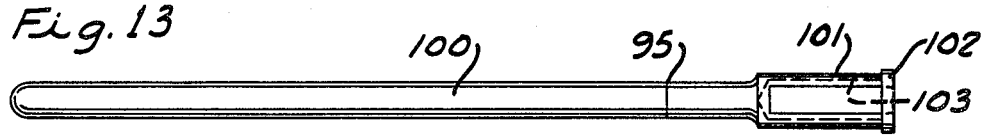
FIG. 13 is a view of a biopsy burr.
Figure 14:
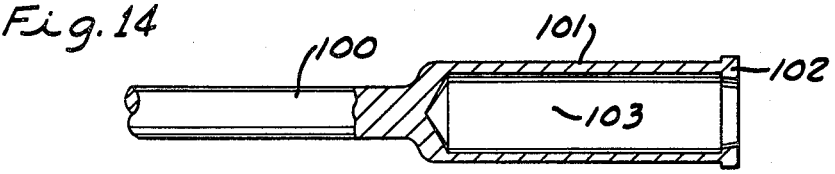
FIG. 14 is an enlarged sectional view of the biopsy burr of FIG. 13.
Figure 15:
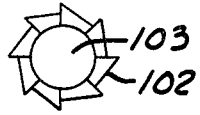
FIG. 15 is an end view of the burr shown in FIG. 14.

In the structure of FIGS. 13, 14 and 15 is illustrated in actual size and in enlarged size a biopsy cutting tool 100 with its enlarged socket 101 having an end and perimetral cutting teeth 102 which are slightly larger than the wall of the biopsy tube that receives the section of the bone that is cut by the teeth 102 into the chamber 103.

Referring now to FIG. 16 wherein is shown a fluted bone removal cutting tool 104 having its elliptical burr type head with a plurality of teeth which are notched as indicated at 105 for the purpose of aiding in the operation of the cutting teeth to produce a cut similar to that of a saw or a drill or in any manner in which it is desired that the cutting tool be used. As illustrated the tool is being applied to cut an anterior cervical fusion employing an outboard tool support 16 with its extended cylindrical section 82. This extension sleeve allows maximum depth while the tool gently cuts out the graft area and the adjacent soft tissue is protected by this extension sleeve and the tool is maintained visible during the operation.

In FIGS. 17 and 18 the long extended drill type cutting tool is shown in combination with a very long stem on a drill 106 which may or may not be provided with an opening for use with a wire. Here the cutting tool safety point 95 is beyond the forceps 107 and is about to be inserted by the forceps 107 into the socket within the telescopic outboard tool support 18. In this view the forceps themselves are causing the outer sections 87 and 88 of the telescopic outboard tool support to be telescoped within the section 18.

In FIG. 18 the cutting tool 106 with its safety line 105 is shown to be materially longer than visible in FIG. 17 and the whole of the collapsible outboard tool support 18 is shown independently and extended.

In FIG. 19 an outboard tool support 15 is shown supporting a tool 108 similar to that illustrated in FIG. 16 but being somewhat shorter and supported by the short outboard tool support for use in making a window through the antrum.

FIG. 20 illustrates the laminectomy outboard tool support 17 with the extension 84 and the opening 86 exposing the cutting surfaces of the tapered cutting tool 110 illustrating how the extension protects approximal dural tissue when performing a cervical laminectomy.

FIG. 21 discloses the use of a dura guard 111 for protecting the dura while cutting the skull laterally in a craniotomy.

I claim:
1. An outboard support for a rotary surgical cutting tool including a mounting grip means on one end of the support, and a bearing mounted adjacent the other end of said support to rotatably carry the complementary end of the surgical cutting tool, and an intermediate tubular means secured to and directly connecting the mounting grip means and the bearing at said other end.

2. The outboard support of claim 1 characterized by slidable telescopic sections defining said intermediate tubular means.

3. The outboard support of claim 1 characterized in that said intermediate tubular means is larger in diameter than said grip mounting means.

4. The outboard support of claim 1 characterized by a bar extension secured to the bearing end of said intermediate tubular means and extending parallel to the axis thereof to expose the coextensive portion of said surgical cutting tool.

5. The outboard support of claim 4 characterized by a head on the end of said bar extension with an opening therein to receive the end of the surgical cutting tool.

6. The outboard support of claim 1 characterized by a small diameter intermediate tubular means substantially the same diameter of the bearing it supports.

7. An outboard support for a rotary surgical cutting tool comprising a tubular support, mounting means secured on one end of said tubular support, and an outboard antifriction bearing mounted in said support adjacent the opposite end thereof to journal a rotary surgical cutting tool.

References Cited
UNITED STATES PATENTS

| 1,004,118 | 9/1911 | Waters | 32—29 |
| 1,387,553 | 8/1921 | Miller | 74—612 |
| 2,576,112 | 11/1951 | Gordon | 74—612 |
| 3,128,079 | 4/1964 | De Groff | 128—305 |

OTHER REFERENCES

V. Mueller and Co., Catalog No. 65, 1963, pp. 406, 364, 458 and 562.

LOUIS G. MANCENE, *Primary Examiner.*

RICHARD A. GAUDET, *Examiner.*

G. E. McNEILL, *Assistant Examiner.*